Patented Apr. 22, 1930

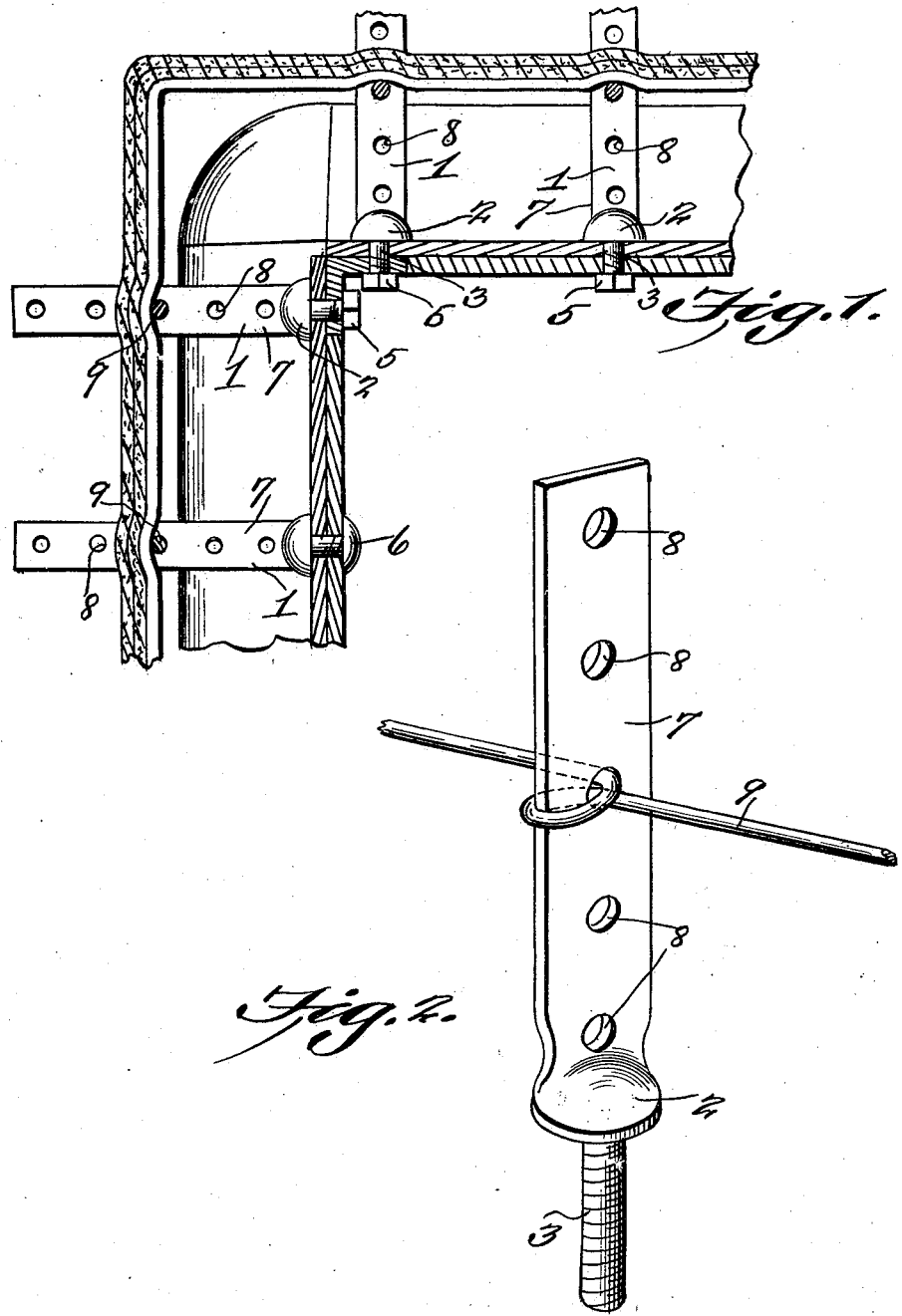

1,755,469

UNITED STATES PATENT OFFICE

WILLIAM M. CONNERY, OF PHILADELPHIA, PENNSYLVANIA

COVER HANGER AND PLATE-FASTENING DEVICE

Application filed May 18, 1928. Serial No. 278,880.

The present invention has for its purpose to provide, in a cover hanger and plate fastening device, an article of manufacture, means by which several plates in desired sequence may be fastened together, with an extension or supporting means on the head of the device to receive a cover hanger means, whereby the cover may be supported in spaced relation from a wall, yet in such wise as to permit the cover to escape projections or reinforcements that may be carried by the surface of the wall.

Another purpose is to afford means included with the support or extension of the headed plate fastening element consisting of openings in the support or extension which may receive cover hanger means consisting of tie rods by which the cover may be supported, it being the purpose to provide a plurality of these supports on headed fastening elements so that a cover of substantial area may be supported.

Still another purpose is to provide a device of this kind constructed in one piece, affording a very cheap article of manufacture and which can be used for the support of various articles other than a cover.

It is to be understood that the particulars herein given are in no way limitative and that while still keeping within the scope of the invention, any desired modifications of the detail and desired proportions may be made in the apparatus according to the circumstances.

The invention comprises further features and combination of parts, as will be hereinafter set forth, shown in the drawings and claimed.

Figure 1 is a vertical sectional view through a portion of a wall, showing a cover supported in spaced relation from the wall so as to escape any engagement with reinforcements or other projections that may be on the wall.

Fig. 2 is an enlarged detail perspective view of the combined plate fastening element and cover support.

Referring to the drawings, 1 identifies the combined plate fastening element and cover support as a whole, and the plate fastening element consists of a head 2 and a shank 3, which may be threaded as shown for the reception of a nut 5, or which may be swaged, as shown at 6, in order to fasten metal plates together.

Projecting from and integral with the head is a support or extension 7 and which, while being preferably flat, and of a particular length as shown, may be of any shape and any length, some having a plurality of openings or apertures 8, to receive a cover hanger means, such as a tie wire or the like 9.

In using the device, the shank is first extended through adjacent overlapping parts of metal plates, and its end is either swaged or provided with a nut, it being obvious that the plates in being fastened together in this way, a projection or support, as projecting integrally from the head of the element, is also mounted as projecting from the side of the wall. In other words, the application of one element results in the application of the other, so that a cover may be subsequently attached to the wall in spaced relation thereto for the purpose of providing an insulating or air space and yet at the same time enabling the cover to escape contact with any projection or corrugation that may be a part of the wall.

The invention having been set forth, what is claimed is:

1. As an article of manufacture, a combined plate fastening element and cover support, consisting of a headed element with a projection formed integral with the head of the element, whereby application of the element to fasten two plates together permits the application of a cover thereon to be spaced from the wall.

2. As an article of manufacture, a combined plate fastening element and cover support consisting of a headed element and a projection formed integral with the head, the projection having a plurality of openings any one of which is adapted for the reception of cover hanger means.

3. As an article of manufacture, a one-piece cover hanger support consisting of a plate or blade provided with means for fastening one end of the plate or blade to a wall, and permitting a cover to be supported thereon, said plate or blade having means to attach the same to a wall.

4. As an article of manufacture, a one-piece cover hanger support consisting of a plate or blade provided with means for fastening one end of the plate or blade to a wall, and permitting a cover to be supported thereon, said plate or blade having means to attach the same to a wall, and said plate or blade having a plurality of openings or apertures any one of which is adapted for the reception of suitable cover hanger means.

5. As an article of manufacture, a one piece cover hanger support comprising a bolt shank adapted for fastening two overlapping plates together, a nut engaging with one end of the bolt shank tight against the face of one of the plates, the other end of the bolt shank having a head to engage tight against the face of the other plate, a blade constructed integrally with and projecting from the head in alignment with the bolt shank, said blade provided with a plurality of openings disposed equidistances apart in a direction from the head, any one of said openings adapted for the reception of tie or reinforcing rods, which are permitted to move through the openings incident to the expansion of said plate.

6. The combination with a pair of plates edgewise overlapping, of bolts passing through the overlapped portions of the plates and having means threaded on their shanks to tighten and secure the plates together, the head of each bolt having an integral blade extending a substantial distance from the head and in alignment with the shank of the bolt, said blade having a plurality of openings arranged equi-distances from each other in a direction from the head of the bolt, and a tie or reinforcing rod being adapted for longitudinal movement through any one of said openings corresponding to the expansion and contraction of the metal plates.

In witness whereof the inventor's signature is hereunto affixed.

WILLIAM M. CONNERY.